US009262453B2

(12) United States Patent
Makimoto et al.

(10) Patent No.: US 9,262,453 B2
(45) Date of Patent: Feb. 16, 2016

(54) INFORMATION PROCESSING SYSTEM AND PROCESSING METHOD FOR USE THEREWITH

(71) Applicant: Hitachi, Ltd., Tokyo (JP)

(72) Inventors: Yoshinobu Makimoto, Kashiwa (JP); Shimpei Ohyama, Ushiku (JP); Yuki Masaki, Hitachinaka (JP); Keiji Numao, Hitachinaka (JP)

(73) Assignee: HITACHI, LTD., Tokyo (JP)

( * ) Notice: Subject to any disclaimer, the term of this patent is extended or adjusted under 35 U.S.C. 154(b) by 439 days.

(21) Appl. No.: 13/758,026

(22) Filed: Feb. 4, 2013

(65) Prior Publication Data

US 2013/0262529 A1 Oct. 3, 2013

(30) Foreign Application Priority Data

Mar. 27, 2012 (JP) ................................ 2012-071742

(51) Int. Cl.
*G06F 17/30* (2006.01)
*G06Q 50/16* (2012.01)
*G06Q 10/00* (2012.01)

(52) U.S. Cl.
CPC .......... *G06F 17/30312* (2013.01); *G06Q 10/00* (2013.01); *G06Q 50/163* (2013.01)

(58) Field of Classification Search
CPC ......................... G06F 17/30067; G06F 3/0605
USPC ....................................................... 707/812
See application file for complete search history.

(56) References Cited

U.S. PATENT DOCUMENTS

| 5,764,972 A * | 6/1998 | Crouse .............. G06F 17/30194 |
| 8,682,904 B1 * | 3/2014 | Weber ................. G06F 17/3053 707/748 |
| 9,053,109 B1 * | 6/2015 | Joshi ................. G06F 17/30073 |
| 2004/0027619 A1 * | 2/2004 | Sato et al. ..................... 358/407 |
| 2005/0198378 A1 * | 9/2005 | Okada .................. G06F 9/5072 709/238 |

(Continued)

FOREIGN PATENT DOCUMENTS

| JP | 2000-307624 | 11/2000 |
| JP | 2001-159985 | 6/2001 |

(Continued)

OTHER PUBLICATIONS

JP Office Action for Japanese Application No. 2012-071742, issued on May 20, 2014.

*Primary Examiner* — Noosha Arjomandi
(74) *Attorney, Agent, or Firm* — Baker Botts L.L.P.

(57) ABSTRACT

Information processing system including pluralities of first and second equipment items, and a third equipment item. Each first equipment item stores history data and returns a first response block about controls and changes in status of each first equipment item, responsive to a data request from the second equipment items. Each second equipment item stores the history data returned responsive to the data request; a second response block returns history data stored in the second history storage block responsive to a request from the third equipment item; first and second lists store first information identifying latest history data returned from the first equipment items regarding each first equipment item, and second information identifies history data last returned to the third equipment item regarding each first equipment item. Third equipment item's third history storage block stores history data returned responsive to the data request made to the second equipment items.

4 Claims, 12 Drawing Sheets

(56) References Cited

U.S. PATENT DOCUMENTS

| | | | | |
|---|---|---|---|---|
| 2009/0319491 | A1* | 12/2009 | Akao | G06Q 30/02 |
| 2010/0036837 | A1* | 2/2010 | Ando et al. | 707/5 |
| 2010/0191922 | A1* | 7/2010 | Dickey | G06F 3/061 |
| | | | | 711/154 |
| 2011/0078610 | A1* | 3/2011 | Tashiro | G06F 17/24 |
| | | | | 715/771 |
| 2012/0254167 | A1* | 10/2012 | Kamada | G06Q 10/06 |
| | | | | 707/736 |

FOREIGN PATENT DOCUMENTS

| | | |
|---|---|---|
| JP | 2005-092576 | 4/2005 |
| JP | 2006-339726 | 12/2006 |

* cited by examiner

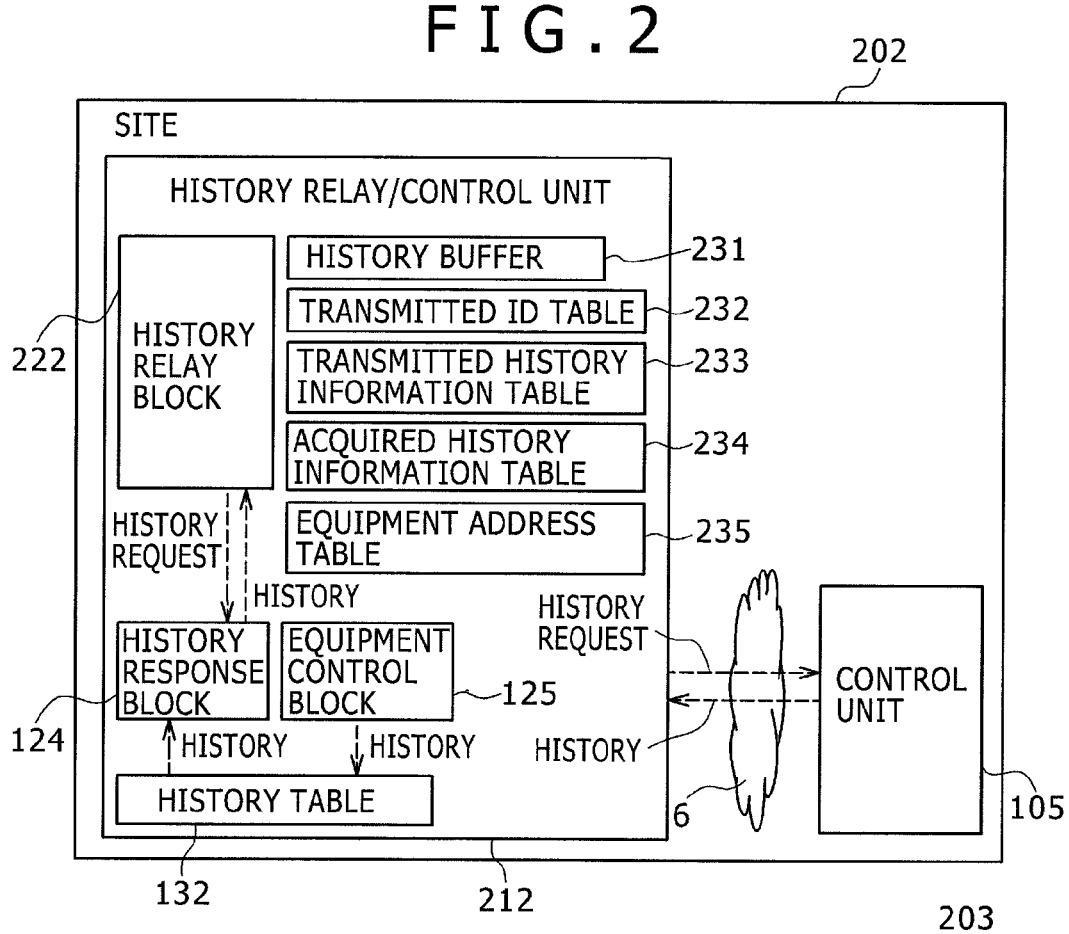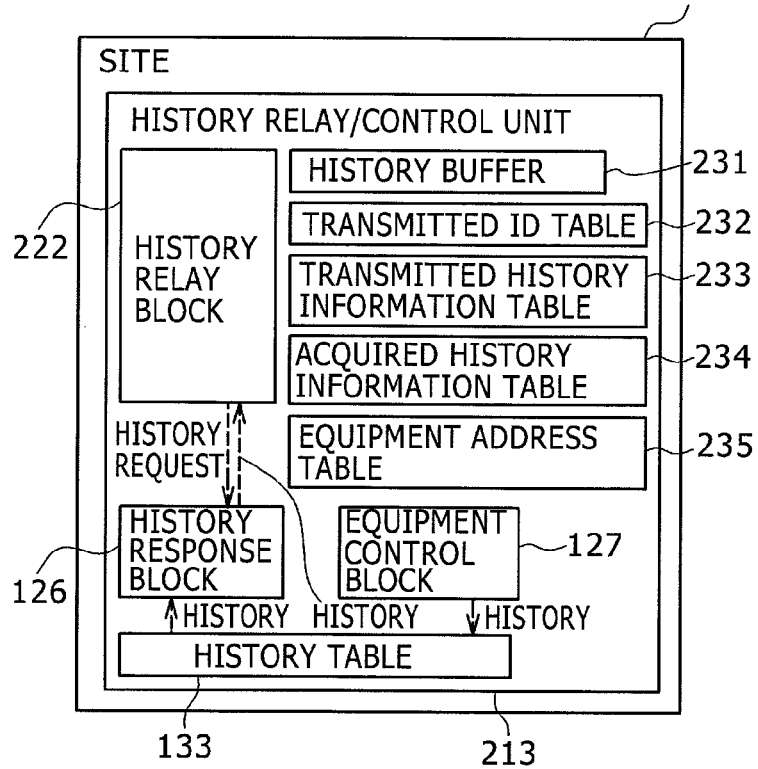

FIG.7

SITE MANAGEMENT TABLE 332

| SITE NO. | SITE ADDRESS | HISTORY ID |
|---|---|---|
| 1 | 192.0.2.1 | 5 |
| 2 | 192.0.2.2 | 7 |
| 3 | 192.0.2.3 | 2 |

FIG.8

SITE HISTORY TABLE 341

| ID | EQUIPMENT NO. | DATE AND TIME | DESCRIPTION |
|---|---|---|---|
| 1 | 2 | 2011-01-15T08:00:49 | ENTRANCE--ENTRY (CARD-OPERATED) -A032423468239442 |
| 2 | 1 | 2011-01-15T08:03:12 | LIVING ROOM--ENTRY (CARD-OPERATED) -A032423468239442 |
| 3 | 1 | 2011-01-15T08:04:12 | LIVING ROOM--DOOR OPENED ABNORMALLY (ALARM TRIGGERED) |
| 4 | 3 | 2011-01-15T08:04:23 | BACK DOOR--ENTRY/EXIT TERMINAL ANOMALY (ALARM TRIGGERED) |
| 5 | 1 | 2011-01-15T08:04:32 | LIVING ROOM--DOOR OPENED ABNORMALLY (ALARM RESET) |

FIG.9

HISTORY TABLE                                                          131

| SEQUENCE NO. | DATE AND TIME | DESCRIPTION |
|---|---|---|
| 1 | 2011-01-15T08:03:12 | LIVING ROOM--ENTRY (CARD-OPERATED)-A032423468239442 |
| 2 | 2011-01-15T08:04:12 | LIVING ROOM--DOOR OPENED ABNORMALLY (ALARM TRIGGERED) |
| 3 | 2011-01-15T08:04:32 | LIVING ROOM--DOOR OPENED ABNORMALLY (ALARM RESET) |
| 4 | 2011-01-15T08:08:43 | LIVING ROOM--EXIT (CARD-OPERATED)-A032423468239442 |

FIG.10

HISTORY BUFFER                                                         231

| ID | EQUIPMENT NO. | SEQUENCE NO. | DATE AND TIME | DESCRIPTION |
|---|---|---|---|---|
| 1 | 2 | 1 | 2011-01-15T08:00:49 | ENTRANCE--ENTRY (CARD-OPERATED)-A032423468239442 |
| 2 | 1 | 1 | 2011-01-15T08:03:12 | LIVING ROOM--ENTRY (CARD-OPERATED)-A032423468239442 |
| 3 | 1 | 2 | 2011-01-15T08:04:12 | LIVING ROOM--DOOR OPENED ABNORMALLY (ALARM TRIGGERED) |
| 4 | 3 | 1 | 2011-01-15T08:04:23 | BACK DOOR--ENTRY TERMINAL ANOMALY (ALARM TRIGGERED) |
| 5 | 1 | 3 | 2011-01-15T08:04:32 | LIVING ROOM--DOOR OPENED ABNORMALLY (ALARM RESET) |
| 6 | 2 | 2 | 2011-01-15T08:05:07 | ENTRANCE--ENTRY (CARD-OPERATED)-A891548845488482 |
| 7 | 1 | 4 | 2011-01-15T08:08:43 | LIVING ROOM--EXIT (CARD-OPERATED)-A032423468239442 |

FIG.11

TRANSMITTED ID TABLE

| TRANSMITTED ID |
|---|
| 5 |

TRANSMITTED HISTORY INFORMATION TABLE 233

| EQUIPMENT NO. | TRANSMITTED SEQUENCE NO. | DATE AND TIME OF TRANSMISSION |
|---|---|---|
| 1 | 3 | 2011-01-15T08:04:32 |
| 2 | 1 | 2011-01-15T08:00:49 |
| 3 | 1 | 2011-01-15T08:04:23 |

FIG.13

ACQUIRED HISTORY INFORMATION TABLE 234

| EQUIPMENT NO. | ACQUIRED SEQUENCE NO. | DATE AND TIME OF ACQUISITION |
|---|---|---|
| 1 | 4 | 2011-01-15T08:08:43 |
| 2 | 2 | 2011-01-15T08:05:07 |
| 3 | 1 | 2011-01-15T08:04:23 |

FIG.14

EQUIPMENT ADDRESS TABLE

| EQUIPMENT NO. | COMMUNICATION ADDRESS | 235 |
|---|---|---|
| 1 | 192.0.2.101 | |
| 2 | 192.0.2.102 | |
| 3 | 192.0.2.103 | |

INFORMATION PROCESSING SYSTEM AND PROCESSING METHOD FOR USE THEREWITH

BACKGROUND OF THE INVENTION

1. Field of the Invention

The present invention relates to an information processing system and a processing method for use therewith wherein history information is collected from equipment items over a network for equipment item management and other purposes.

2. Description of the Related Art

There exist information processing systems that collect history information from equipment items in offices (buildings), factories and the like for room entry/exit management, energy management, and equipment item management. With these systems, the equipment items are usually managed within a local network. Where the Internet is used for such management purposes, dedicated servers and networks of particular customers have been generally used to constitute a dedicated system. In recent years, there have also been proposed SaaS (Software as a Service) services and cloud services in which a single system is utilized by numerous customers.

Where equipment items are managed via the Internet as mentioned above and where histories of controls and changes in status of the equipment items are collected, it is preferred that the same history not be collected again. For example, JP-2005-92576-A proposes a technique for preventing the same information from being acquired in duplicate as a result of inadvertent operations by a user, the technique being one of history management that involves comparing the downloadable data stored in a server with the history of orders placed by a client to determine whether or not to offer the data to that client.

JP-2006-339726-A proposes a technique for use when continuously transmitted data is relayed while some data is getting lost along the way. The technique involves searching for data items that match acknowledge numbers based on previous data history information, to find the most recent of the matching history information. The most recent matching history information is set as the data history information for correcting the acknowledge numbers of the data.

SUMMARY OF THE INVENTION

The technique disclosed in JP-2005-92576-A requires attaching flags to contents so that the collected contents may be managed by both the server and the client. The technique does not take into consideration the case where large quantities of flagged contents are to be continuously updated or the case where the flagged contents are to be restored following a failure.

The technique disclosed in JP-2006-339726-A may be used to correct the data numbers if data is lost while being relayed. However, the correction of the data numbers should take place within one communication and needs to be continued throughout the communication of interest.

In the above-outlined type of information processing system, there are numerous equipment items to be managed by center equipment. Where histories of controls and changes in status of each of the equipment items are managed in centralized fashion and where processing is needed every time a new history occurs, the center equipment may well be overloaded. If the history of all equipment items is to be transmitted upon history collection for restoration from disaster, for example, there generally occurs an inordinately large processing load in distinguishing the acquired history that need not be registered again from an unacquired history yet to be registered, with the amount of network communications being raised concurrently.

The present invention has been made in view of the above circumstances and provides an information processing system and a processing method for use therewith wherein histories are kept consistent through just-enough collection and relay of data even in case of failure and wherein processing load and the amount of communication are reduced through efficient data collection and relay.

In carrying out the present invention and according to one embodiment thereof, there is provided an information processing system including a plurality of first equipment items, a plurality of second equipment items, and a third equipment item interconnected via a network. The first equipment items each include a first history storage block which stores history data about controls and changes in status of each of the first equipment items, and a first response block which returns the history data stored in the first history storage block in response to a data request from the second equipment items. The second equipment items each include a second history storage block which stores the history data returned in response to the data request made to the first equipment items; a second response block which returns the history data stored in the second history storage block in response to a request from the third equipment item; a first list which stores first information identifying the latest history data returned from the first equipment items with regard to each of the first equipment items, and a second list which stores second information identifying the history data last returned to the third equipment item with regard to each of the first equipment items. The third equipment item includes a third history storage block which stores the history data returned in response to the data request made to the second equipment items.

According to the present invention, it is possible to implement an information processing system and a processing method for use therewith wherein histories are kept consistent through just-enough collection and relay of data even in case of failure and wherein processing load and the amount of communication are reduced through efficient data collection and relay.

BRIEF DESCRIPTION OF THE DRAWINGS

Other objects and advantages of the invention will become apparent from the following description of embodiments with reference to the accompanying drawings in which:

FIG. 2 is a block diagram showing internal components of a second site (which integrates a history relay unit with a control unit and relays histories of other control units);

FIG. 3 is a block diagram showing internal components of a third site (which integrates a history relay unit with a control unit);

FIG. 7 is an explanatory view showing a typical site management table possessed by the center;

FIG. 8 is an explanatory view showing a typical site history table possessed by an information processor;

FIG. 9 is an explanatory view showing a typical history table possessed by the history relay unit;

FIG. 10 is an explanatory view showing a typical history buffer possessed by the history relay unit;

FIG. 11 is an explanatory view showing a typical transmitted ID table possessed by the history relay unit;

FIG. 12 is an explanatory view showing a typical transmitted history information table possessed by the history relay unit;

FIG. 13 is an explanatory view showing a typical acquired history information table possessed by the history relay unit;

FIG. 14 is an explanatory view showing a typical equipment address table possessed by the history relay unit;

DESCRIPTION OF THE PREFERRED EMBODIMENTS

Some preferred embodiments of the information processing system and the processing method for use therewith according to the present invention are described below in detail by reference to the accompanying drawings. Although an information processing system for building management is mainly explained hereunder as an example, this is not limitative of the present invention. This invention may be embodied otherwise as long as the embodiment can collect information such as histories of equipment items over a network for equipment item management and other purposes.

Figure 1:
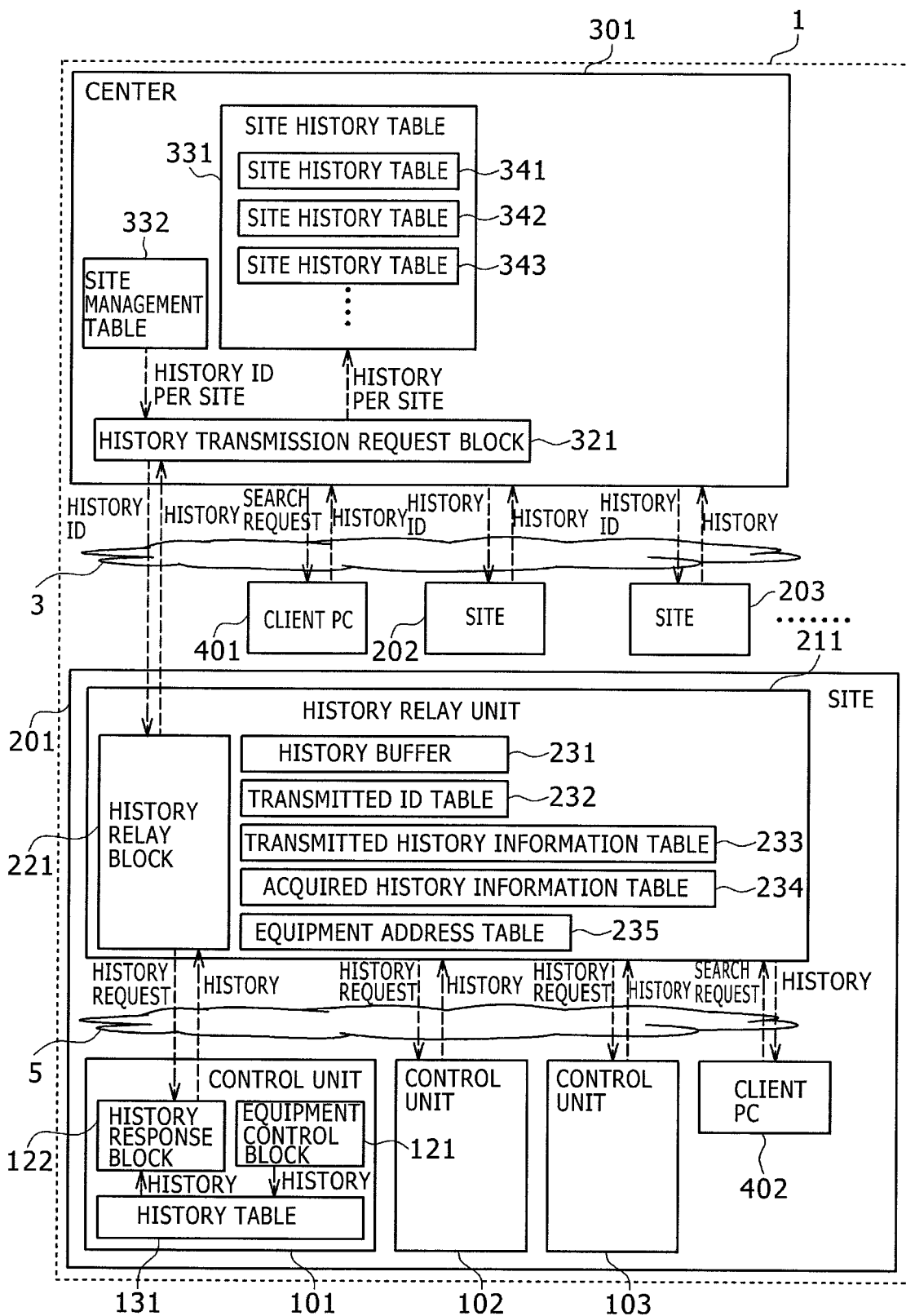
FIG. 1 is a block diagram of an information processing system as one embodiment of the present invention.

FIG. 1 is a block diagram of an information processing system 1 as one embodiment of the present invention. In FIG. 1, the information processing system 1 embodying the invention includes a center 301, a first site 201, a second site 202, a third site 203, and a client PC 401, all interconnected via a global network 3. The first through the third sites 201 through 203 each include at least a control unit as an equipment item and a history relay unit that relays history information generated by the control unit (equipment item) to the center 301, the control unit being either independent of or integrated with the history relay unit. It should be noted that the configuration in FIG. 1 is only an example and that the number of sites and that of client PC's are not limited to those shown in FIG. 1.

An overall structure of the center 301 and of the first site 201 is explained below. The center 301 includes a site history table 331, a site management table 332, and a history transmission request block 321. The site management table 331 is structured to reflect each of the configured sites and includes a first site history table 341, a second site history table 342, a third site history table 343, etc.

The first site 201 includes a history relay unit 211, a first control unit 101, a second control unit 102, a third control unit 103, and a client PC 402. The history relay unit 211 includes a history relay block 221, a history buffer 231, a transmitted ID table 232, a transmitted history information table 233, an acquired history information table 234, and an equipment address table 235. The first through the third control units 101 through 103 each include a history response block 122, an equipment control block 121 and a history table 131. The first through the third control units 101 through 103 make up "first equipment," the history relay unit 211 constitutes "second equipment," and the center 301 represents "third equipment."

Explained next are the components configured in the center 301 and the equipment items configured and connected to the center 301 via the global network 3. The center 301 is a group of server units managing a plurality of sites in centralized fashion. The global network 3 is a public network such as the Internet or telephone lines interconnecting the center 301, first site 201, second site 202, third site 203, and client PC 401.

The center 301 includes a site history table 331 (third history storage block), a site management table 332 (third list), and a history transmission request block 321. The site history table 331 stores history data returned from the first site 201 (history relay unit 211), second site 202 and third site 203 in response to data requests made thereto by the center 301. The site management table 332 stores history IDs per site identifying the last history data returned to the center 301 from each of the first site 201 (history relay unit 211), second site 202, and third site 203.

Specifically, the history transmission request block 321 of the center 301 acquires from the site management table 332 the history ID and communication destination address of each of the first site 201, second site 202, and third site 203. The history transmission request block 321 makes a history acquisition request to each of the first site 201, second site 202, and third site 203 by transmitting a history ID plus 1 to each of the sites.

When history data is returned from the first site 201, second site 202, and third site 203, the history transmission request block 321 adds the history data that came from the first site 201 to the first site history table 341, the history data from second site 202 to the second site history table 342, and the history data from the third site 203 to the third site history table 343. Using the IDs of the last history data returned from the respective sites, the history transmission request block 321 updates the site management table 332.

The history transmission request block 321 makes history requests to the first site 201, second site 202, and third site 203 either periodically or when given notification therefrom.

By making a history information search request to the center 301 via the global network 3, the client PC 401 may have history information returned therefrom in response and have the returned information displayed on the PC screen in a suitable format so that the user may verify the content of the history information. That is, upon receipt of the history information search request from the client PC 401, the center 301 retrieves from the site history table 331 the history data matching the search request and returns the retrieved history data to the client PC 401.

The components configured in the first site 201 are explained next. For example, the first site 201 may be a system set up inside a building. It should be noted that the sites need not correspond to buildings on a one-to-one basis; a plurality of sites may be established within a building, or a plurality of buildings may be covered by a single site.

The first site 201 is connected to the center 301 via the global network 3, so that the history relay unit 211 communicates with the center 301. In the first site 201, there is a local network 5 such as a LAN (local area network) wired throughout the building and interconnecting the history relay unit

211, first control unit 101, second control unit 102, third control unit 103, and client PC 402.

The history relay unit 211 includes the history relay block 221 (second response block), history buffer 231 (second history storage block), acquired history information table 234 (first list), transmitted ID table 232, transmitted history information table 233 (second list), and equipment address table 235.

The history relay block 221 makes a history request to each of the first control unit 101, second control unit 102, and third control unit 103, and stores the history data returned therefrom in the history buffer 231. Also, in response to a request from the center 301, the history relay block 221 returns thereto the history data stored in the history buffer 231.

The acquired history information table 234 stores per control unit the acquired sequence numbers and the dates and times of acquisition (first information) of the latest history data returned from the first control unit 101, second control unit 102, and third control unit 103. The transmitted ID table 232 and transmitted history information table 233 each store the transmitted IDs, transmitted sequence numbers, and dates and times of transmission (second information) identifying the history data last returned to the center 301 with regard to each of the configured control units.

Specifically, given a request for a history ID from the center 301, the history relay block 221 of the history relay unit 211 acquires the corresponding history data from the history buffer 231, returns the acquired data to the center 301, and updates the transmitted ID table 232 and transmitted history information table 233 accordingly.

Also, the history relay block 221 of the history relay unit 211 acquires from the acquired history information table 234 and equipment address table 235 the acquired sequence numbers, dates and times of acquisition, and communication addresses of the first control unit 101, second control unit 102 and third control unit 103, and makes history requests to the respective control units via the local network 5. When the history data is returned from the first control unit 101, second control unit 102 and third control unit 103, the history relay block 221 adds the history data to the history buffer 231 and updates the acquired history information table 234 accordingly.

By making a history information search request to the history relay unit 211 via the local network 5, the client PC 402 may have the history information returned therefrom and have the returned information displayed on the PC screen of the client PC 402 in a suitable format so that the user may verify the content of the history information.

That is, given the history information search request from the client PC 402, the history relay unit 211 acquires from the history buffer 231 the history data matching the search request and returns the acquired history data to the client PC 402. The history information search request from the client PC 402 is composed of a date and time and history data content. The history relay unit 211 compares the requested date and time and history data content with the history data, one item at a time, in the history buffer 231 to acquire the history data dated subsequent to the requested date and time or the history data partially matching the requested content, and returns the acquired history data.

Of the first through the third control units 101 through 103, the first control unit 101 is explained next as representative of the other units. The first control unit 101 is connected to the history relay unit 211 via the local network 5. The first control unit 101 includes the history response block 122 (first response block), equipment control block 121, and history table 131 (first history storage block). The history table 131 stores the history data about controls and changes in status of this first control unit 101. Also, in response to a data request from the history relay block 221, the history response block 122 returns thereto the history data stored in the history table 131.

Specifically, upon receipt of the history data request from the history relay block 221, the history response block 122 of the first control unit 101 acquires the history data from the history table 131 and returns the acquired data to the history relay block 221. The equipment control block 121 of the first control unit 101 controls such equipment items as doors, electrical locks, sensors, contacts, digital measuring instruments, and analog measuring instruments, and registers in the history table 101 the results of such control and the values input from the equipment. Upon registering history data in the history table 131, the first control unit 101 may notify the history relay unit 211 of the occurrence of a history.

Explained next in reference to FIG. 2 are the components configured in the second site 202. The second site 202 includes a history relay/control unit 212, a control unit 105, and a local network 6. The history relay/control unit 212 includes a history relay block 222, the history buffer 231, transmitted ID table 232, transmitted history information table 233, acquired history information table 234, equipment address table 235, a history response block 124, an equipment control block 125, and a history table 132.

Unlike the first site 201, the second site 202 integrates the components of a history relay unit and those of a control unit into a single history relay/control unit 212. However, the functions of the history relay/control unit 212 are the same as those of the history relay unit 211 and first control unit 101 in the first site 201. Thus those components in the second site 202 which are equivalent to those in the first site 201 are designated by the same reference characters and their explanations will be omitted hereunder where redundant.

The local network 6 is a network such as a LAN wired throughout the building and interconnecting the history relay/control unit 212 and control unit 105. The control unit 105 has the same structure as the first control unit 101 of the first site 201.

The components configured in the third site 203 are explained next in reference to FIG. 3. The third site 203 includes a history relay/control unit 213 that has the same structure as the history relay/control unit 212 of the second site 202. Unlike the second site, the third site 203 has no local network 6. Given the appreciably simplified network structure, work inside the building is much easier to accomplish.

Although this embodiment shows the intra-site configuration to include the first site 201, second site 202 and third site 203, this is only an example. The number of history relay units, the number of control units, the number of history relay/control units, and the layout of the components in each site are only for illustrative purposes and not limitative of the present invention.

Figure 4:
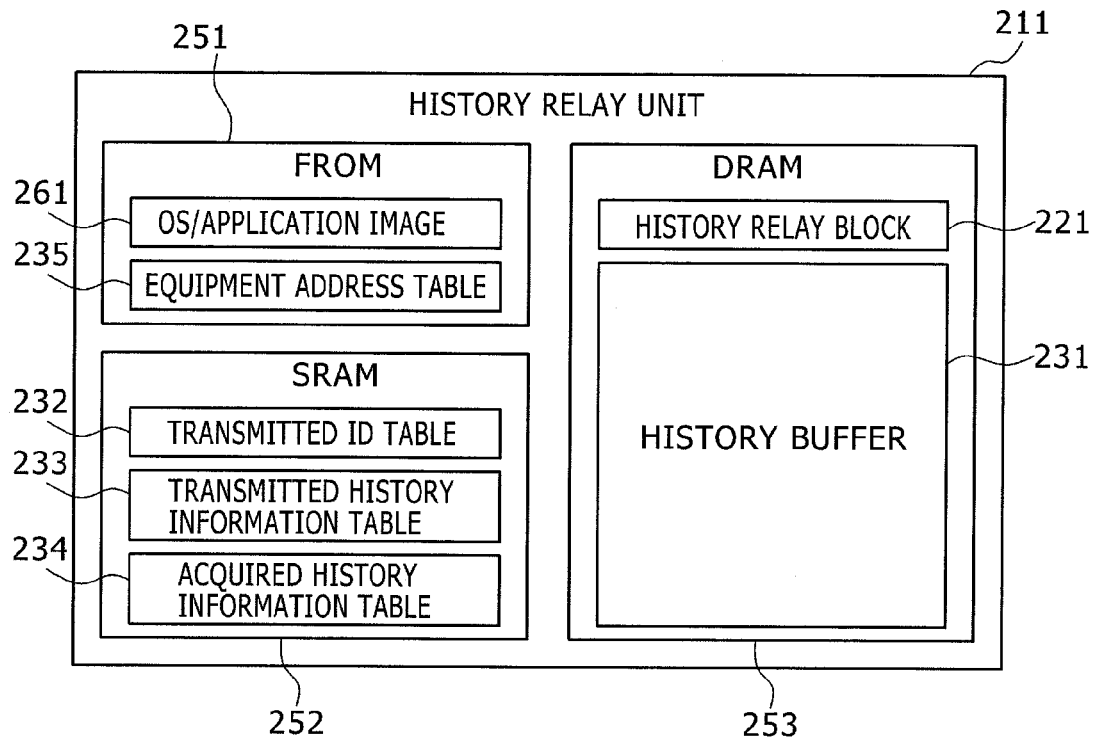
FIG. 4 is an explanatory view showing how the components of the history relay unit are typically laid out in storage units.

Explained next is how the components of the history relay unit 211, those of the first control unit 101 and those of the history relay/control unit 212 are laid out in storage units. FIG. 4 is an explanatory view showing how the components of the history relay unit 211 are typically laid out in storage units. The history relay unit 211 includes an FROM (flash read only memory) 251, an SRAM (static random access memory) 252, and a DRAM (dynamic random access memory) 253 as the storage units.

The FROM 251 is a storage medium that stores its recorded content for extended periods of time. The FROM 251 stores its content when the history relay unit 211 is powered off, but has a slow write speed and is subject to a limited write count.

The FROM 251 stores an OS/application image 261 and the equipment address table 235 constituting information not subject to frequent updates.

The SRAM 252 corresponds to "second storage unit" and can store its content at lower power dissipation, backed up by battery or by capacitor. When the history relay unit 211 is powered off, the SRAM 252 stores its content as long as it is powered by battery or by capacitor. However, the SRAM is generally expensive and difficult to enlarge in capacity. The SRAM 252 stores the transmitted ID table 232, transmitted history information table 233, and acquired history information table 234 constituting information of small size.

The DRAM 253 corresponds to "first storage unit" and is a storage medium that stores its content while being powered. When the history relay unit 211 is powered off, the DRAM 253 loses its content. Still, the DRAM generally provides a large capacity. The DRAM 253 stores the programs of the history relay block 221 and the history buffer 231 (i.e., large-size data) as information that can be reconstituted after power-off.

The OS/application image 261 includes the programs needed for the history relay unit 211 to operate. These programs are loaded into the DRAM 253 and start to be executed when the history relay unit 211 is activated. The programs of the history relay block 221 are included in the OS/application image 261 and are executed after the history relay unit 211 is activated.

Figure 5:
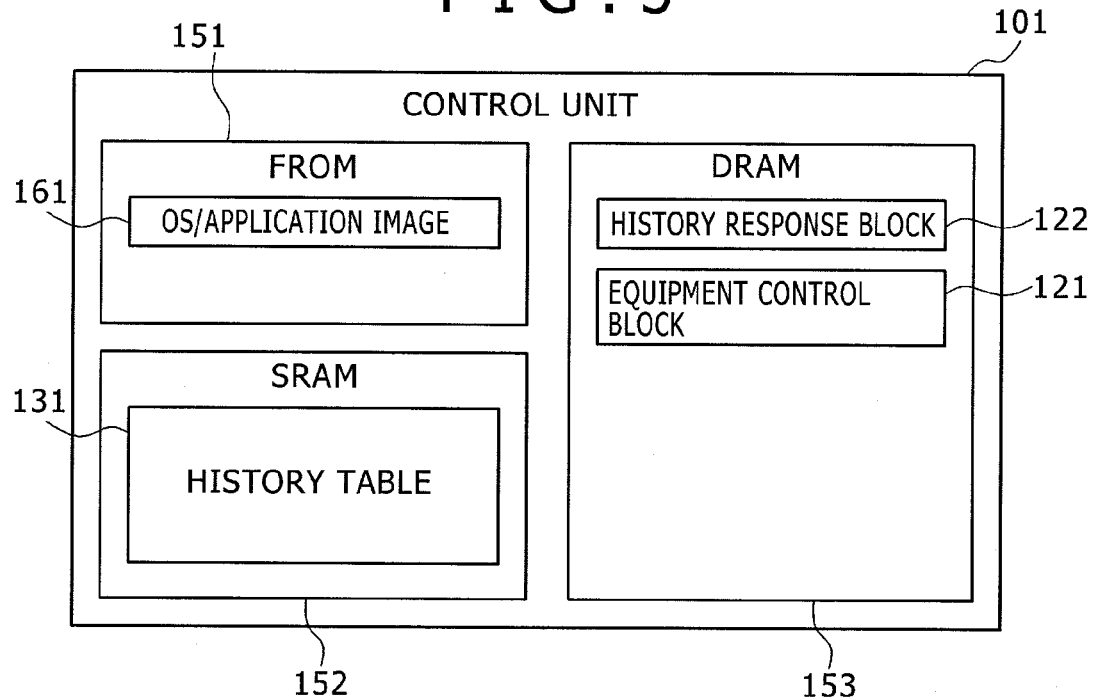
FIG. 5 is an explanatory view showing how the components of the control unit are typically laid out in storage units.

FIG. 5 is an explanatory view showing how the components of the first control unit 101 are typically laid out in storage units. The first control unit 101 includes an FROM 151, an SRAM 152, and a DRAM 153.

The FROM 151 stores an OS/application image 161. The SRAM 152 stores the history table 131. The DRAM 153 stores the history response block 122 and equipment control block 121. The OS/application image 161 has the programs necessary for the first control unit 101 to operate, including the operation programs of the history response block 122 and equipment control block 121.

Figure 6:
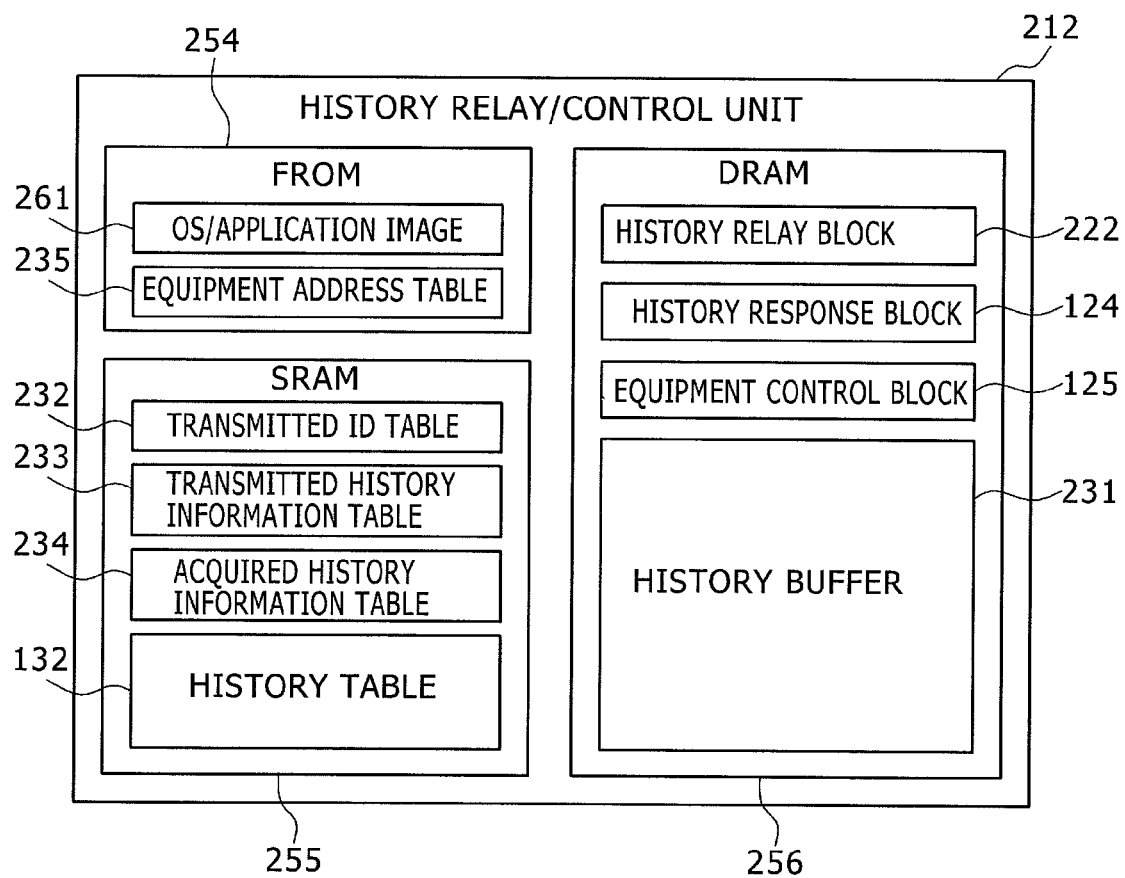
FIG. 6 is an explanatory view showing how the components of an integrated history relay/control unit are typically laid out in storage units.

FIG. 6 is an explanatory view showing how the components of the history relay/control unit 212 are typically laid out in storage units. The history relay/control unit 212 includes an FROM 254, an SRAM 255, and a DRAM 256.

The FROM 254 stores the OS/application image 261 and equipment address table 235. The SRAM 255 stores the transmitted ID table 232, transmitted history information table 233, acquired history information table 234, and history table 132. The DRAM 256 stores the history relay block 222, history response block 124, equipment control block 125, and history buffer 231. The OS/application image 261 has the programs necessary for the history relay/control unit 212 to operate, including the operation programs of the history relay block 222, history response block 124, and equipment control block 125.

Explained below in reference to FIGS. 7 through 14 are the tables possessed by the history relay unit 211 and first control unit 101.

FIG. 7 is an explanatory view showing the site management table 332 possessed by the center 301. The site management table 332 is used to manage the address and history ID of each of the sites, and includes as its table items a site number, a site address, and a history ID. The site number is a number uniquely allocated to each site. In this embodiment, the numbers 1, 2 and 3 are allocated to the first site 201, second site 202 and third site 203, respectively. The site address is the address of each site on the global network 3. The history ID is the ID of the latest history data returned from the history relay unit of each site. As such, the history IDs correspond to those in the site history table 341 and history buffer 231.

FIG. 8 is an explanatory view showing a typical site history table possessed by the center 301. The site history table stores the history of each site and has as its table items an ID, an equipment number, a date and time, and a description. The ID, equipment number, date and time, and description items store respectively the ID, equipment number, date and time, and description of the history date returned from each history relay unit. The site history table is preserved for years. The site history table in FIG. 8 shows typical content of the first site history table 341 corresponding to the first site 201 of this embodiment. The same form of content applies to the content of the second site history table 342 and that of the third site history table 343.

FIG. 9 is an explanatory view showing the history table 131 possessed by the first history relay unit 101. The history table 131 stores history data and has as its table items a sequence number, a date and time, and a description. The sequence number item stores serial numbers of history data generated in the first control unit 101. The sequence number starts at 1 and is incremented (by 1) every time history data is generated. The date and time item stores the dates and times at which history data was generated. The description item stores details of equipment control and changes in equipment status, generated in the first control unit 101.

The history table 131 stores only the history data generated in the first control unit 101, thus storing fewer data items than the history buffer 231 of the history relay unit 201. That is, its limited storage capacity requires the history table 131 to accommodate a limited number of data items. In the event of a capacity overflow, data items are deleted from the history table 131 on a first-in-first-out basis. The same holds for the history tables possessed by the other control units 102 through 105.

FIG. 10 is an explanatory view showing the history buffer 231 possessed by the history relay unit 211. The history buffer 231 is used to manage the history data of each control unit and has as its table items an ID, an equipment number, a sequence number, a date and time, and a description.

The IDs are each a serial number allocated by the history relay unit 211 and incremented (by 1) every time a history data item is added upon acquisition from a control unit. The equipment numbers correspond to those in the equipment address table 235 and represent the control units that returned history data. The sequence number item, date and time item, and description item store respectively the sequence numbers, dates and times, and descriptions of the history data returned from each control unit. The history buffer 231 stores more data items than the history table 101 in order to accommodate the history data from the control units. Because of its limited capacity, the history buffer 231 is subject to storing a limited number of data items. In the event of a capacity overflow, data items are deleted from the history buffer 231 on a first-in-first-out basis. The same holds for the history buffers possessed by the other history relay/control units 212 and 213.

FIG. 11 is an explanatory view showing the transmitted ID table 232 possessed by the history relay unit 211. The transmitted ID table 232 is used to manage the ID of the history transmitted to the center 301, and has a transmitted ID as its table item. The transmitted ID item stores the ID of the history data last transmitted to the center 301. The same holds for the transmitted ID tables possessed by the other history relay/control units 212 and 213.

FIG. 12 is an explanatory view showing the transmitted history information table 233 possessed by the history relay unit 211. The transmitted history information table 233 is used to manage transmitted history data per control unit and includes equipment numbers, transmitted sequence numbers, and dates and times of transmission. The equipment numbers stored in the transmitted history information table 233 correspond to those in the equipment address table 235. Of the history data of which the equipment number in the history buffer 231 and of which the equipment number in the transmitted history information table 233 coincide with each other among the history data in the history buffer 231, the sequence number and the date and time of the history last transmitted to the center 101 are stored as the transmitted sequence number and the date and time of transmission. The same holds for the transmitted history information tables possessed by the other history relay/control units 212 and 213.

FIG. 13 is an explanatory view showing the acquired history information table 234 possessed by the history relay unit 211. The acquired history information table 234 is used to manage the acquired history data per control unit and has as its table items an equipment number, an acquired sequence number, and a date and time of acquisition. The equipment number item stores the numbers corresponding to the equipment numbers in the equipment address table 235. The acquired sequence number item and the date and time of acquisition item store, respectively, the sequence numbers and the dates and times of acquisition of the last received histories among the history data returned from the control units corresponding to the equipment numbers. The same holds for the acquired history information tables possessed by the other history relay/control units 212 and 213.

FIG. 14 is an explanatory view showing the equipment address table 235 possessed by the history relay unit 211. The equipment address table 235 is used to manage the addresses of the control units and has as its table items an equipment number and a communication address. The equipment numbers are each allocated uniquely to each control unit in the site. The equipment address table 235 corresponds to the first site 201, so that the equipment numbers 1, 2 and 3 in this table 235 correspond to the first control unit 101, second control unit 102 and third control unit 103, respectively. The communication addresses denote the addresses of the control units on the local network 5. The same holds for the equipment address tables possessed by the other history relay/control units 212 and 213.

Explained below in reference to FIGS. 15 through 19 is the processing method for use with the information processing system furnished with the above-described components.

Figure 15:
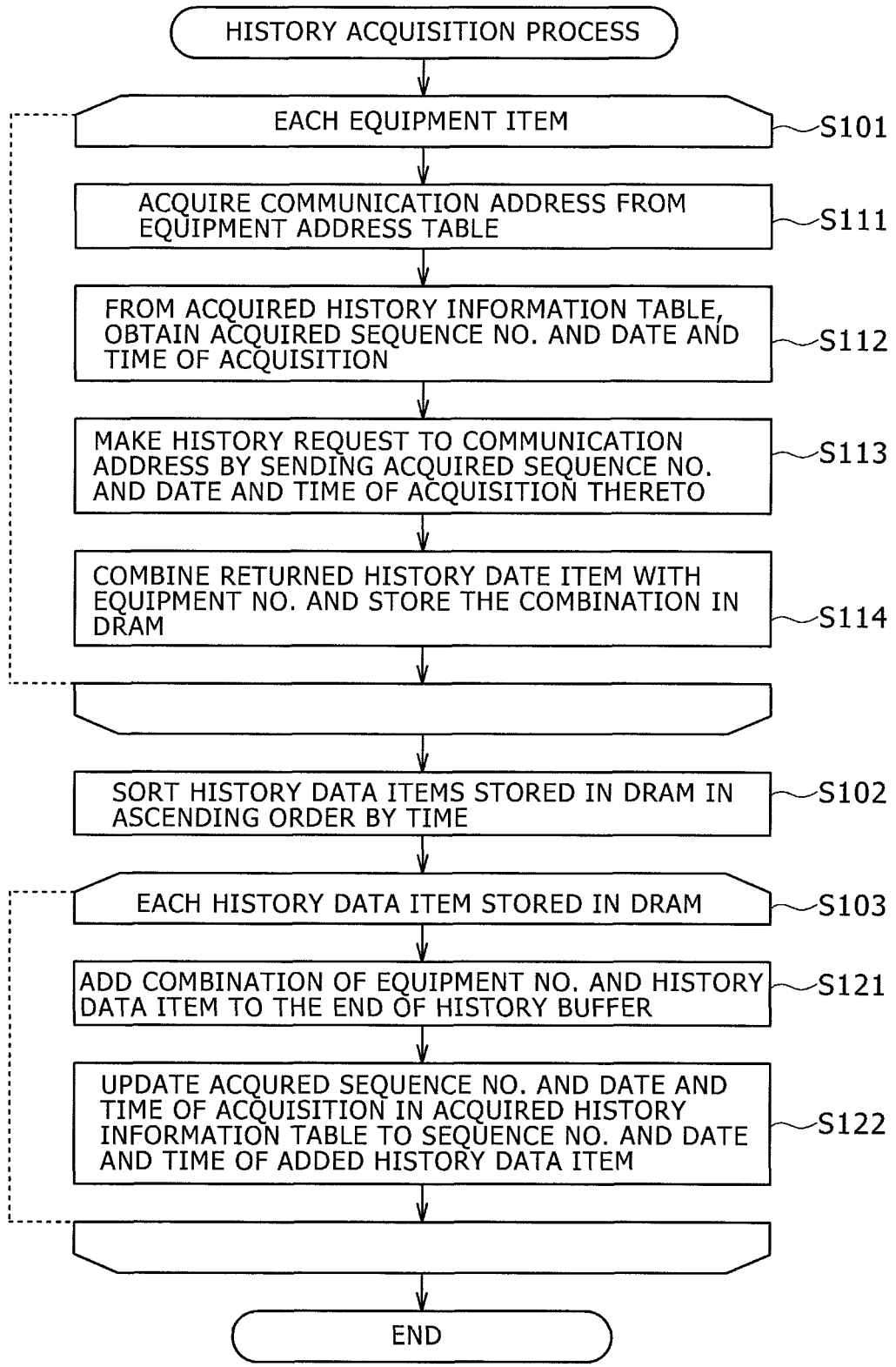
FIG. 15 is a flowchart explaining the procedure for the history relay unit to acquire histories from control units.

Explained first in reference to the flowchart of FIG. 15 is the procedure for the history relay unit 211 to collect history data from each control unit. This history acquisition process is carried out either periodically or upon receipt of notification that history data has been generated from a given control unit.

First, by referencing the equipment address table 235 (see FIG. 14), the history relay unit 211 repeats steps S111 through S114 per equipment number (step S101). That is, the history relay unit 211 acquires the communication address corresponding to the equipment number of a given control unit from the equipment address table 235 (step S111). Also, by referencing the acquired history information table 234 (see FIG. 13), the history relay unit 211 obtains the acquired sequence number and the date and time of acquisition corresponding to the equipment number in question (step S112).

The history relay unit 211 then transmits a history request to the communication address corresponding to the equipment number, the history request being the combination of the acquired sequence number and the date and time of acquisition corresponding to the equipment number of interest (step S113). The history relay unit 211 proceeds to allocate in the DRAM 253 a temporary storage area for storing the history data returned in response to the transmitted history request, and places the returned history data supplemented with the equipment number into the temporary storage area (step S114).

The history data items placed in the temporary storage area of the DRAM 253 are then sorted in ascending order by time (step S102). At this point, the correspondence between each history data item and the equipment number associated therewith is maintained.

The combinations of the history data items and their equipment numbers sorted in the temporary storage area of the DRAM 253 are acquired. Each history data item is subjected to the process of steps S121 and S122 being repeated (step S103).

That is, each combination of the history data item and its equipment number obtained in the temporary storage area is added to the end of the history buffer 231 (see FIG. 10) (step S121). At this point, the ID of the added history data item is given as 1 plus the largest of the IDs in the history buffer 231 in effect before the addition was made. If the number of history data items in the history buffer 231 exceeds a predetermined number, the first of the history data items in the history buffer 231 is deleted. Preferably, when the number of history data items in the history buffer 231 reaches a predetermined rate with regard to a predetermined number, a history collection request may be sent to the center 101.

In the acquired history information table 234 (see FIG. 13), the row corresponding to the equipment number added in step S121 is identified. The acquired sequence number and the date and time of acquisition in the row corresponding to the equipment number in question are updated to the sequence number and the date and time of acquisition of the history data item added in step S121 (step S122). After the repeated process of steps S121 and S122 above is completed, the temporary storage area in the DRAM 253 is deallocated.

Figure 16:
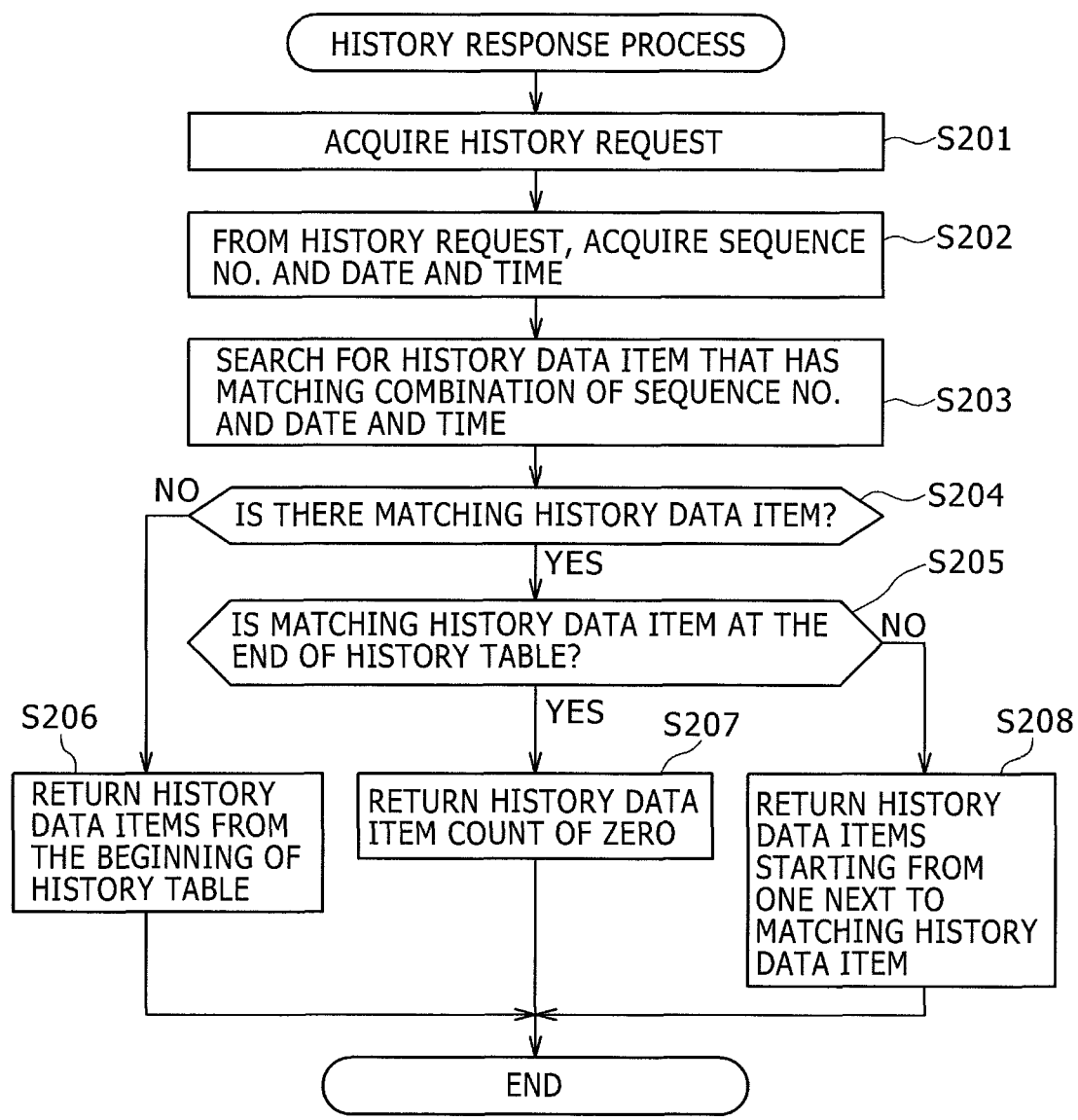
FIG. 16 is a flowchart explaining the procedure for the control unit to return histories to the history relay unit in response to a request therefrom.

The procedure for the first control unit 101 to return history data to the history relay unit 211 in response to a request therefrom is explained below in reference to the flowchart of FIG. 16. This history response process is started when the first control unit 101 is activated. The first control unit 101 is explained here as representative of the second control unit 102 and third control unit 103, the latter two units utilizing the same procedure as the first control unit 101.

The first control unit 101 first waits for a history request (which includes the acquired sequence number and the date and time of acquisition from the history relay unit 211) to arrive from the history relay unit 211. Upon arrival of the history request, the first control unit 101 acquires the request (step S201).

From the acquired history request, the sequence number and the date and time of acquisition are obtained (step S202). For each of the sequence numbers and the dates and times of acquisition with regard to the history data items in the history table 131 (see FIG. 9), a search is made for the history data item of which the acquired sequence number and date and time of acquisition match the sequence number and the date and time of acquisition in question (step S203).

That is, it is determined whether there exists the history data item of which the sequence number and the date and time of acquisition match the sequence number and the date and time of acquisition of interest (step S204). If there is the matching history data item, step S205 is reached and it is determined whether the matching history data item is the last history data item in the history table 131. If there is no matching history data item, step S206 is reached.

In the absence of the matching history data item, it is determined that all history data items in the history table 131 are newly generated. In that case, all history data items from the beginning of the history table 131 are returned to the history relay unit 211 (step S206).

If the matching history data item is the last history data item in the history table 131, then it is determined that there is no new history data item in the history table 131. In that case, the history data item count of zero is returned to the history relay unit 211 (step S207).

If the matching history data item is not the last history data item in the history table 131, that means the matching data item is found halfway through the table 131. In that case, it is determined that there exist history data items yet to be acquired following the requested item. Then all history data items from the one next to the matching history data item to the last history data item are returned to the history relay unit 211 (step S208). When the above steps have been completed, the history response process is again started.

Figure 17:
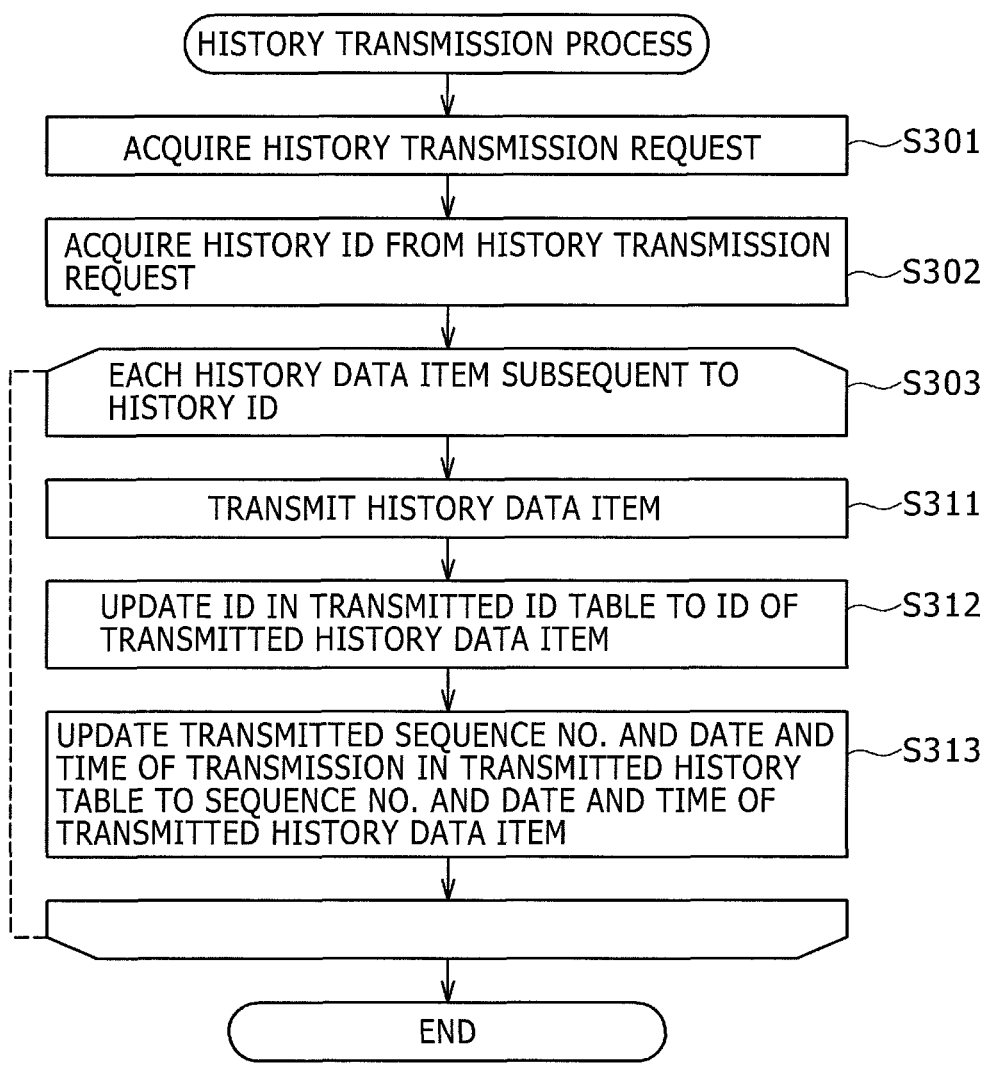
FIG. 17 is a flowchart explaining the procedure for the history relay unit to return histories to the center in response to a request therefrom.

Explained next in reference to the flowchart of FIG. 17 is the procedure for the history relay unit 211 to return history data to the center 301 in response to a request therefrom. This history transmission process is carried out when the history relay unit 211 is activated.

The history relay unit 211 first waits for a history transmission request (which includes the history ID plus 1 on the side of the center 301) to arrive from the center 301. Upon arrival of the history transmission request, the history relay unit 211 acquires the history transmission request in question (step S301).

From the acquired history transmission request, the history ID is obtained (step S302). Thereafter, the history data items subsequent to the history ID in the history buffer 231 (see FIG. 10) are acquired. With regard to each of the history data items acquired, steps S311 through S313 are repeated (step S303).

That is, the history data item acquired from the history buffer 231 is transmitted to the center 301 (step S311). The transmitted ID in the transmitted ID table 232 (see FIG. 11) is updated to the ID of the transmitted history data item (step S312).

In the transmitted history information table 233 (see FIG. 12), the row of the equipment number matching the equipment number of the transmitted history data item is identified. The sequence number and the date and time of transmission of that row are updated to the sequence number and the date and time of transmission of the transmitted history data item (step S313). When the above steps have been completed, the history transmission process is restarted.

Figure 18:
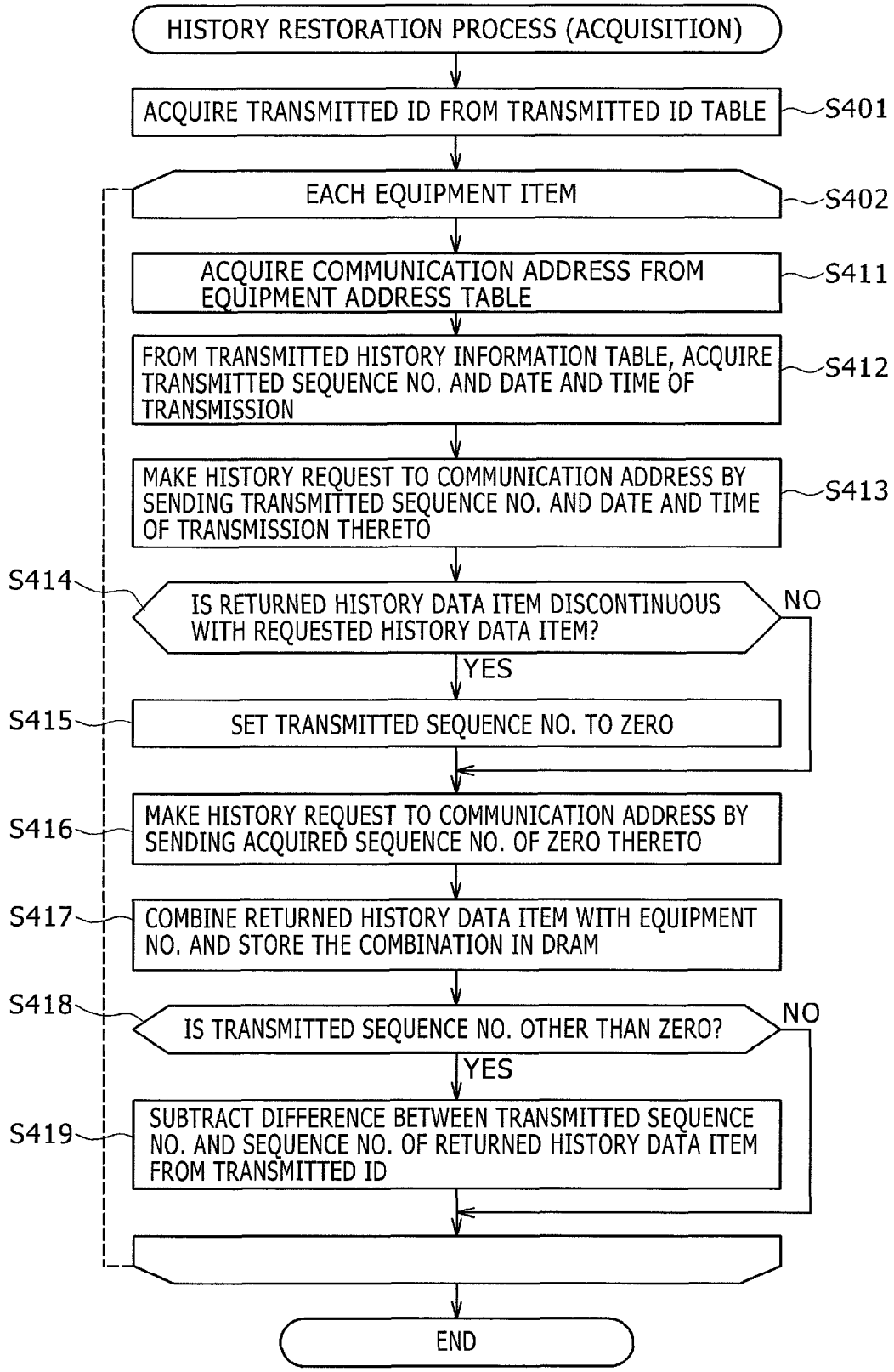
FIG. 18 is a flowchart explaining the procedure for acquiring histories and identifying history IDs after the history relay unit is restarted.

Explained next in reference to the flowchart of FIG. 18 is the procedure for acquiring history data items and identifying their history IDs after the history relay unit 211 is restarted. This history restoration process (acquisition) is carried out when the history relay unit 211 is restarted.

The history relay unit 211 first acquires the transmitted ID from the transmitted ID table 232 (see FIG. 11) (step S401). The rows in the equipment address table 235 (see FIG. 14) are then acquired. With regard to the control unit having the communication address corresponding to the equipment number in each of the acquired rows, steps S411 through S419 are repeated (step S402).

That is, the history relay unit 211 acquires the communication address corresponding to the equipment number of interest from the equipment address table 235 (step S411).

From the transmitted history information table 233 (see FIG. 12), the transmitted sequence number and the date and time of transmission corresponding to the equipment number are acquired (step S412). The control unit having the communication address thus acquired is then notified of the combination of the acquired sequence number and the date and time of transmission and is thereby requested to return a history data item (step S413).

Thereafter, the history relay unit 211 waits for a history data item to be returned from the control unit. Upon receipt of the history data item, the history relay unit 211 determines whether the returned data item is subsequent to the requested history data item (step S414). That is, if there is at least one history data item returned from the control unit and if the sequence number of the first history data item is not next to the acquired sequence number communicated to the control unit, it is determined that the returned history data item is not subsequent to the requested history data item.

If the returned history data item is not subsequent to the requested history data item, i.e., if the sequence number of the first history data item is not next to (i.e., is discontinuous with) the acquired sequence number communicated to the control unit, step S415 is reached. In that case, the history relay unit 211 identifies the row corresponding to the equipment number in the transmitted history information table 233, and sets the transmitted sequence number of the identified row to zero (step S415). That is, in the subsequent steps, all history data items returned from the control unit will be handled as new history data items.

If the returned history data item is subsequent to the requested history data item, i.e., if the sequence number of the first history data item is next to (i.e., continuous with) the acquired sequence number communicated to the control unit, nothing is done and step S416 is reached. In this case, the history data items with their sequence numbers subsequent to the sequence number next to the transmitted sequence number in the transmitted history information table 233 will be handled as new history data items.

The history relay unit 211 then makes a history data request, in which the acquired sequence number is zero, to the control unit having the communication address corresponding to the equipment number (step S416). This allows the history relay unit 211 to acquire all history data items from the beginning, which are possessed by the control unit.

In order to store the history data returned from the control unit in response to the history request, the history relay unit 211 allocates a temporary storage area in the DRAM 253. After adding the equipment number to the returned history data, the history relay unit 211 stores the data in the temporary storage area of the DRAM 253 (step S417).

The history relay unit 211 then identifies the row corresponding to the equipment number in the transmitted history information table 233 and determines whether the transmitted sequence number of the identified row is zero (step S418). If the transmitted sequence number is other than zero (i.e., continuous), step S419 is reached. If the transmitted sequence number is zero (i.e., discontinuous), nothing is done and the process is terminated.

If the transmitted sequence number is other than zero (continuous), the difference between the transmitted sequence number in the transmitted history information table 233 and the sequence number of the first history data item placed in the temporary storage area of the DRAM 253 is subtracted from the transmitted ID in the transmitted ID table 232. The transmitted ID in the transmitted ID table 232 is updated to the result of the subtraction (step S419). Upon completion of the above steps, a history restoration process (registration) shown in FIG. 19 is carried out.

Figure 19:
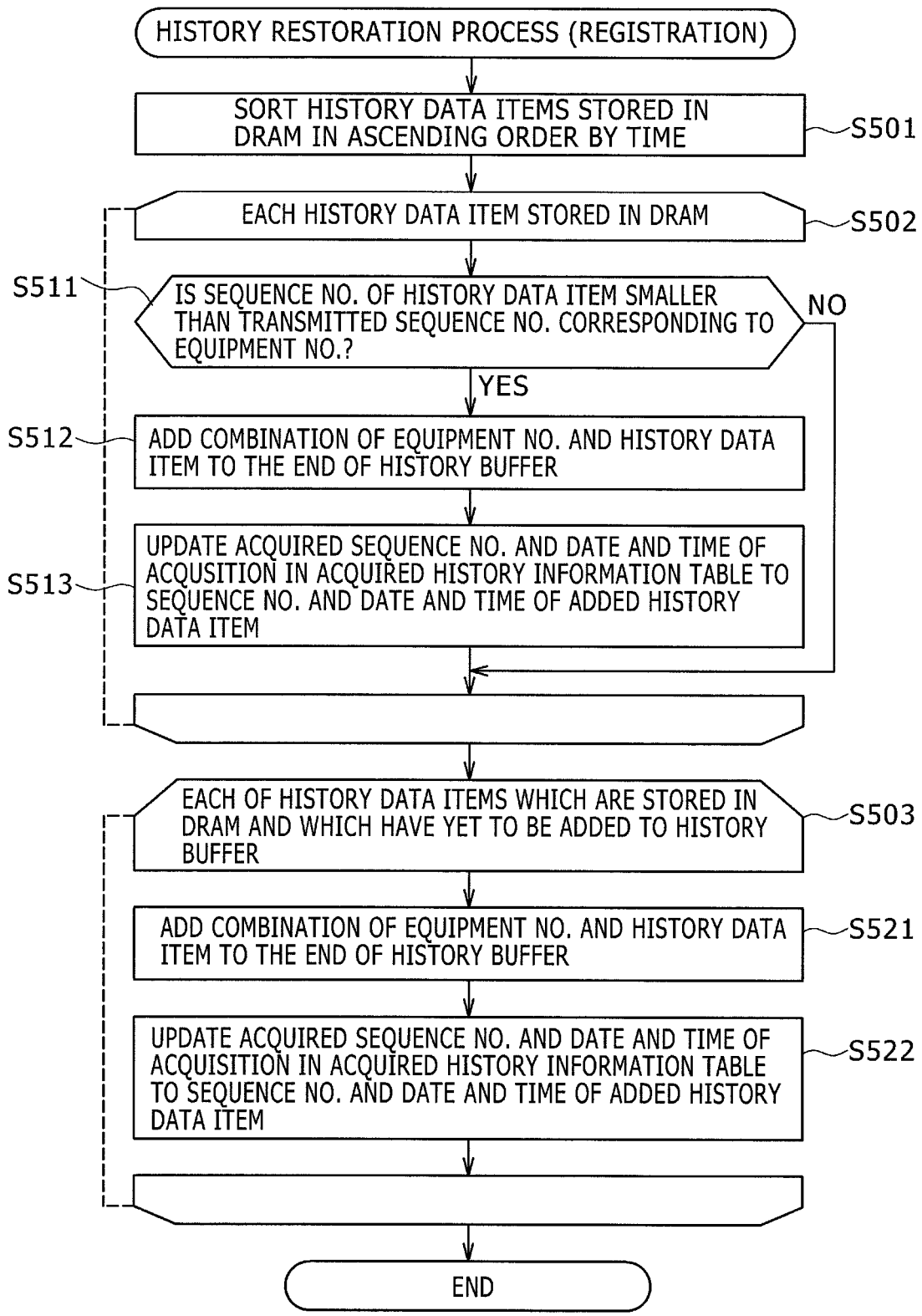
FIG. 19 is a flowchart explaining the procedure for registering histories in accordance with the history IDs identified by the history relay unit.

Explained next in reference to the flowchart of FIG. 19 is the procedure for registering history data items in according with the history IDs identified by the history relay unit 211. This history restoration process (registration) is carried out following the execution of the history restoration process (acquisition) shown in FIG. 18.

The history data items stored in the temporary storage area in the DRAM 253 are sorted in ascending order by time (step S501). At this point, the correspondence between each history data item and the equipment number associated therewith is maintained.

The combinations of the history data items and their equipment numbers sorted in the temporary storage area of the DRAM 253 are acquired. Each history data item is subjected to the process of steps S511 through S513 being repeated (step S502). That is, this is a process of registering in the history buffer 231 the history data items that have been transmitted to the center 301.

It is first determined whether the sequence number of a history data item in the temporary storage area is smaller than the transmitted sequence number corresponding to the equipment number in the transmitted history information table 233 (step S511). If the sequence number of the history data item is smaller than the transmitted sequence number, it is determined that the history data item in question has already been transmitted to the center 301, and step S512 is reached. If the sequence number of the history data item is not smaller than the transmitted sequence number, it is determined that the history data item in question has yet to be transmitted to the center 301. In that case, the repetitive process of step S502 (step S511 through S513) is terminated and step S503 is reached.

If the sequence number of the history data item is smaller than the transmitted sequence number, the combination of the history data item and its equipment number sorted in the temporary storage area is added to the end of the history buffer 231 (step S512). At this point, the ID of the added history data item is given as 1 plus the largest of the IDs in the history buffer 231 in effect before the addition was made. If the number of history data items in the history buffer 231 exceeds a predetermined number, the first of the history data items in the history buffer 231 is deleted.

Then in the acquired history information table 233, the row corresponding to the equipment number of the added history data item is identified. The acquired sequence number and the date and time of acquisition in the identified row are updated to the sequence number and the date and time of acquisition of the added history data item (step S513). The history data item added to the history buffer 231 is deleted thereafter from the temporary storage area of the DRAM 253.

Those combinations of history data items and their equipment numbers which have not been processed in the repeated process of step S502 (steps S511 through S513) and which remain in the temporary storage area of the DRAM 253 are then acquired. Each of these combinations is subjected to steps S521 and S522 being repeated (step S503). That is, this is a process of registering in the history buffer 231 the history data items yet to be transmitted to the center 301.

One of the combinations of history data items and their equipment numbers is first added to the end of the history buffer 231 (step S521). At this point, the ID of the added history data item is given as 1 plus the largest of the IDs in the history buffer 231 in effect before the addition was made. If the number of history data items in the history buffer 231 exceeds a predetermined number, the first of the history data items in the history buffer 231 is deleted.

Then in the acquired history information table 233, the acquired sequence number and the date and time of acquisition corresponding to the equipment number of the added history data item are updated to the sequence number and the date and time of acquisition of the added history data item. At the end of the repetitive process of steps S521 and S522, the temporary storage area in the DRAM 253 is deallocated.

As explained above, the information processing system of this embodiment has a plurality of control units (first equipment items), a plurality of history relay units (second equipment items), and the center 301 (third equipment item) interconnected via the global network 3. The first control units 101 each have the history table 131 (first history storage block) that stores history data about controls and changes in status of the first control unit 101 in question, and the history response block 122 (first response block) that returns history data stored in the history table 131 to the history relay unit 211 in response to a data request coming therefrom.

The history relay units 211 each have the history buffer 231 (second history storage block) that stores the history data returned from the first control unit 101 in response to a data request made thereto, and the history relay block 221 (second response block) that returns the history data stored in the history buffer 231 to the center 301 in response to a request therefrom. Each history relay unit 211 also has the acquired history information table 234 (first list) for storing the acquired sequence numbers and the dates and times of acquisition (first information) identifying per control unit the latest history data returned from each first control unit 101; the transmitted ID table 232 and transmitted history information table 233 (second list) for storing the transmitted IDs, transmitted sequence numbers, and dates and times of transmission (second information) identifying per control unit the history data last returned to the center 301; and the history IDs (third information) identifying the last history data returned to the center 301.

The center 301 has the site history table 331 (third history storage block) that stores the history data returned from the history relay unit 211 in response to a data request made thereto, and the site management table 332 (third list) that stores the history IDs with regard to each of the history relay unit 211.

When the center 301 of this information processing system transmits a history ID to a history relay unit 211, the history relay unit 211 returns to the center 301 the history data items registered subsequent to the history data item identified by the history ID (first step). When the history relay unit 211 transmits a transmitted sequence number to a first control unit 101, the first control unit 101 returns to the center 301 the history data items registered subsequent to the history data item identified by the transmitted sequence number (second step).

That is, the history relay unit 211 collects from the first control unit 101 the history data items registered subsequent to the history data item identified by the transmitted sequence number. When relaying data (upload) to the center 301, the history relay unit 211 returns the history data items registered subsequent to the history data item identified by the history ID identifying the last history data item returned by the history data unit 211 to the center 301.

As described above, which data items have been transmitted and which data items have yet to be transmitted can be determined not by time information but by the sequence numbers and history IDs identifying data items. This eliminates the possibility of the missed collection or relay of the data with identical timestamps or the data occurring along different timelines. That in turn makes it possible to implement the information processing system and processing method for use therewith wherein history data items are kept consistent through just-enough collection and relay of the data. There is less processing load in distinguishing the acquired histories that need not be registered from the histories that have yet to be acquired and need to be registered, so that the collection and relay of duplicate history data are suppressed. This further contributes to implementing the information processing system and processing method for use therewith wherein processing load and the amount of communication are reduced through efficient data collection and relay.

Specifically, consider the case where the history buffer 231 is provided in the first storage unit of which the stored content is deleted when the history relay unit 211 is powered off and where the acquired history information table 234, transmitted ID table 232, and transmitted history information table 233 are provided in the second storage unit of which the stored content is stored upon power-off.

In that case, upon restart after power-off, the history relay unit 211 receives the history data returned from the first control unit 101 in response to a transmitted sequence number sent thereto, and stores the returned data as the history data registered subsequent to the history ID of interest. Of the history data items returned from the first control unit 101 in response to the request sent thereto for all history data items stored in the history table 131, those history data items not possessed by the history relay unit 211 in question are stored as the history data items registered prior to the history ID of interest.

As explained above, upon restart after power-off, distinctions are made between the history data items that have been transmitted and those that have yet to be transmitted based on history IDs. This is one feature of the information processing system and processing method for use therewith wherein history data items are kept consistent through just-enough collection and relay of the data. And with less processing load in distinguishing the transmitted history data items from those yet to be transmitted, the collection and relay of duplicate history data are suppressed. This makes it possible to implement the information processing system and processing method for use therewith wherein processing load and the amount of communication are reduced through efficient data collection and relay.

Also, the information processing system of this embodiment may be configured to have the history relay unit 212 including the history table 132 (first history storage block) that stores the history data about controls and changes in status of the history relay unit 212 in question, and the history response block 124 (first response block) than returns the history data stored in the history table 132 in response to a data request from the history relay unit 212 itself. The history relay unit 212 stores the history data returned from itself in the history table 132. Since the history relay unit may contain a control unit within itself, the system can be configured that much flexibly. The network structure is also simplified, so that the work involved is accomplished more easily than before.

Furthermore, the information processing system of this embodiment may be configured to include the client PC 402 (fourth equipment item) that has a request block for requesting the acquisition of history data from the history relay unit 212 and a display unit for displaying the history data acquired from the history relay unit 211. In this case, the history relay unit 211 returns to the client PC 402 the history data stored after being sent from the first control unit 101, in response to a request from the client PC 402. In this manner, the client PC 402 allows the user to verify the content of history information.

It should be understood that the present invention when embodied is not limited to the above-described embodiment and that various modifications, variations, alternatives and design changes may be made of the invention so far as they are within the scope of the appended claims or the equivalents thereof.

What is claimed is:

1. An information processing system comprising:
a memory;
a plurality of first equipment items, a plurality of second equipment items, and a third equipment item interconnected via a network;
wherein said first equipment items each include:
a first history storage block which stores history data about controls and changes in status of each of said first equipment items, and
a first response block which returns the history data stored in said first history storage block in response to a data request from said second equipment items;
wherein said second equipment items each include:
a second history storage block which stores the history data returned in response to the data request made to said first equipment items, said second history storage block formed in a first storage unit of which the stored content is deleted when said second equipment items are powered off,
a second response block which returns the history data stored in said second history storage block in response to a request from said third equipment item, a first list which stores first information identifying the latest history data returned from said first equipment items with regard to each of said first equipment items,
a second list which stores second information identifying the history data last returned to said third equipment item with regard to each of said first equipment items, and
third information which identifies the history data last returned to said third equipment item, wherein said first list, said second list, and said third information is formed in
a second storage unit of which the stored content is stored when said second equipment items are powered off;
wherein said third equipment item includes:
a third history storage block which stores the history data returned in response to the data request made to said second equipment items, and
a third list which stores said third information with regard to each of said second equipment items;
wherein, when said third equipment item transmits said third information to said second equipment items, said second equipment items return the history data registered following the history data identified by said third information;
wherein, when said second equipment items transmit said second information to said first equipment items, said first equipment items return the history data registered following the history data identified by said second information; and
wherein, when restarted after a power-off, said second equipment items acquire said second information from said second list and transmit said second information to said first equipment items to receive the history data returned therefrom in response, said second equipment items further storing the returned history data as the history data registered following said third information, said second equipment items further storing the history data which is part of all history data returned upon request from said first history storage block of said first equipment items and which was not stored in said second equipment items, as the history data registered prior to said third information.

2. The information processing system according to claim 1, wherein said second equipment items each include: a first history storage block which stores the history data about controls and changes in status of each of said first equipment items, and a first response block which returns the history data stored in said first history storage block in response to a data request from the second equipment item in question, the returned history data being stored in said second history storage block.

3. The information processing system according to claim 1, further comprising: a fourth equipment item including a request block which requests acquisition of history data from said second equipment items, and a display block which displays the history data acquired from said second equipment items; wherein, in response to a request from said fourth equipment item, said second equipment items return thereto the history data stored after being returned from said first equipment items.

4. The information processing method for use with an information processing system having a first equipment item, a second equipment item, and a third equipment item interconnected via a network, said first equipment item including;

a first history storage block which stores history data about controls and changes in status of said first equipment item, and a first response block which returns the history data stored in said first history storage block in response to a data request from said second equipment item, said second equipment item including;

a second history storage block which stores the history data returned from said first equipment item in response to the data request made thereto, said second history storage block formed in a first storage unit of which the stored content is deleted when said second equipment items are powered off, a first response block which returns the history data stored in said second history storage block in response to a request from said third equipment item, a first list which stores first information identifying the latest history data returned from said first equipment with regard to each first equipment item, a second list which stores second information identifying the history data last returned to said third equipment item with regard to each first equipment item, and third information which identifies the history data last returned to said third equipment item, wherein said first list, said second list, and said third information is formed in a second storage unit of which the stored content is stored when said second equipment items are powered off;

said third equipment item including a third history storage block which stores the history data returned from said second equipment item in response to a data request made thereto, and a third list which stores said third information with respect to each second equipment item, said information processing method comprising: a first step in which, when said third equipment item transmits said third information to said second equipment item, said second equipment item returns the history data registered following the history data identified by said third information;

a second step in which, when said second equipment item transmits said second information to said first equipment item, said first equipment item returns the history data registered following the history data identified by said second information; and a third step in which, when restarted after a power-off, said second equipment items acquire said second information from said second list and transmit said second information to said first equipment items to receive the history data returned therefrom in response, said second equipment items further storing the returned history data as the history data registered following said third information, said second equipment items further storing the history data which is part of all history data returned upon request from said first history storage block of said first equipment items and which was not stored in said second equipment items, as the history data registered prior to said third information.

* * * * *